United States Patent
Taniguchi et al.

(10) Patent No.: US 6,566,845 B2
(45) Date of Patent: May 20, 2003

(54) AUTOMOTIVE ALTERNATOR HAVING DETECTOR FOR DETECTING INITIATION OF ROTATION

(75) Inventors: Makoto Taniguchi, Kariya (JP); Shin Kusase, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/178,486

(22) Filed: Jun. 25, 2002

(65) Prior Publication Data

US 2003/0042809 A1 Mar. 6, 2003

(30) Foreign Application Priority Data

Aug. 31, 2001 (JP) ........................................ 2001-263120

(51) Int. Cl.[7] .............................. H02P 9/08; H02P 9/14; H02P 9/10; H02J 7/04; H02J 7/14
(52) U.S. Cl. .............................. 322/28; 322/17; 322/44; 322/59; 322/68
(58) Field of Search ............................................ 322/28

(56) References Cited

U.S. PATENT DOCUMENTS

| | | | | |
|---|---|---|---|---|
| 4,280,087 A | * | 7/1981 | Kasiewicz | 322/28 |
| 4,362,983 A | * | 12/1982 | Mori et al. | 322/28 |
| 4,409,539 A | * | 10/1983 | Nordbrock et al. | 322/28 |
| 4,470,004 A | * | 9/1984 | Morishita et al. | 322/99 |
| 5,023,539 A | * | 6/1991 | Miller et al. | 322/28 |
| 5,059,886 A | * | 10/1991 | Nishimura et al. | 322/28 |
| 5,079,496 A | * | 1/1992 | Pierret et al. | 322/28 |
| 5,160,881 A | * | 11/1992 | Schramm et al. | 322/7 |
| 5,182,511 A | * | 1/1993 | Pierret et al. | 324/545 |
| 5,280,232 A | * | 1/1994 | Kohl et al. | 322/23 |
| 5,319,299 A | * | 6/1994 | Maehara | 322/28 |
| 5,376,876 A | * | 12/1994 | Bauser et al. | 322/28 |
| 5,389,870 A | * | 2/1995 | Falater | 322/28 |
| 5,442,276 A | * | 8/1995 | Schwartz et al. | 322/25 |
| 5,453,901 A | * | 9/1995 | Lackey | 361/21 |
| 5,554,923 A | * | 9/1996 | Maddali et al. | 322/25 |
| 5,602,470 A | * | 2/1997 | Kohl et al. | 324/177 |
| 6,147,474 A | * | 11/2000 | Koss et al. | 322/59 |
| 2002/0021111 A1 | * | 2/2002 | Ogino et al. | 322/28 |
| 2002/0030470 A1 | * | 3/2002 | Takahashi et al. | 322/28 |
| 2002/0043962 A1 | * | 4/2002 | Taniguchi et al. | 322/28 |
| 2002/0047691 A1 | * | 4/2002 | Asada et al. | 322/28 |

FOREIGN PATENT DOCUMENTS

JP          62-44698 U          3/1987

* cited by examiner

Primary Examiner—Nestor Ramirez
Assistant Examiner—Heba Y. M. Elkassabgi
(74) Attorney, Agent, or Firm—Oliff & Berridge, PLC

(57) ABSTRACT

An alternator for use in an automotive vehicle includes a circuit for detecting initiation of rotation of an engine. Upon detecting the initiation of rotation, excitation current supply to a field winding is started, and thereafter an alternator output is controlled by controlling the excitation current. A resistor is connected to one phase winding of an armature to obtain a voltage indicating initiation of rotation during a period in which no excitation current is supplied to the field winding, and a capacitor is connected to another phase winding to raise the indicating voltage level. Since the indicating voltage induced by a small amount of residual magnetism is increased to a sufficient level by the capacitor, the initiation of rotation can be accurately detected.

5 Claims, 4 Drawing Sheets

AUTOMOTIVE ALTERNATOR HAVING DETECTOR FOR DETECTING INITIATION OF ROTATION

CROSS-REFERENCE TO RELATED APPLICATION

This application is based upon and claims benefit of priority of Japanese Patent Application No. 2001-263120 filed on Aug. 31, 2001, the content of which is incorporated herein by reference.

BACKGROUND OF THE INVENTION

1. Field of the Invention

The present invention relates to an alternator for use in an automotive vehicle such as a passenger car or a truck.

2. Description of Related Art

A voltage regulator is used for controlling an output of an automotive alternator. Some types of conventional voltage regulators include a function to detect turning-on of a key switch. Such a voltage regulator initiates supply of exciting current to an alternator upon detection of the turning-on of the key switch. It is usually required to provide signal lines for detecting the key-switch operation.

In order to detect the key switch operation without using the signal lines, JP-U-62-44698 proposes a technology for detecting initiation of rotation of an alternator based on a frequency of a voltage induced in an armature winding due to residual magnetism in field poles. In this manner, whether the alternator is started, i.e., whether the engine is cranked up is detected. Upon detecting the start-up of the alternator, exciting current is supplied to the field winding of the alternator. There has been a requirement, however, to increase a level of voltage induced by the residual magnetism because an amount of residual magnetism is small. U.S. Pat. No. 4,409,539 proposes to improve magnetic characteristics of the field poles by annealing the field poles. Further, JP-A-3-215200 and JP-A-8-503308 disclose a technology to detect initiation of the engine rotation based on a line voltage induced in armature windings of two different phases.

It is found out, however, that there are respective problems in those conventional technologies. In U.S. Pat. No. 4,409,539, though the residual magnetism is improved, a magnetic resistance increases and thereby the output of the alternator in its normal operation decreases. Accordingly, the alternator size has to be enlarged to maintain the output. Further, a large size furnace is necessary for performing the annealing, which results in manufacturing cost increase.

According to the technology disclosed in JP-A-8-503308, a resistor is connected to a phase winding which is different from a phase winding with which the induced voltage is detected, and the phase winding to which the resistor is connected is grounded through the resistor thereby to form a closed circuit. A negative potential also appears across the resistor in a negative half cycle. This means that a so-called line voltage in three-phase windings appears across the resistor. To detect the negative potential, a complex circuit for providing a negative reference potential is required, which results in manufacturing cost increase. Accordingly, only a positive potential appearing in a positive half cycle is practically detectable. The voltage appearing in the positive half cycle cannot be amplified in the technology disclosed in this publication. Therefore, a detecting threshold has to be lowered to improve detection accuracy. If the detecting threshold is lowered, however, a signal-noise ratio (S/N ratio) becomes low because of influence of a leakage current flowing into the alternator from an on-board battery. As a result, it becomes difficult to accurately detect the signal indicating initiation of rotation. U.S. Pat. Nos. 5,376,876 and 6,147,474 propose to eliminate the influence of the leakage current by changing the threshold level according to an armature voltage. To change the threshold level, however, it is necessary to add a logic circuit for this function.

In the device disclosed in JP-A-3-215200, a potential difference between two phases is detected by floating it from the ground. There is a possibility, however, that the detecting circuit is damaged due to a large amount of current flowing into the detecting circuit when the alternator begins to generate power. It is necessary to provide a protecting circuit, such as a current limiter or a switching circuit for intercepting the current, to avoid the above problem. It is not advantageous to provide such a protecting circuit because it makes the detecting circuit complex and expensive. Especially, when the switching circuit is employed, it is required to provide the switching circuit with a proper current capacity and counter-measure against a surge voltage generated by intercepting the current.

SUMMARY OF THE INVENTION

The present invention has been made in view of the above-mentioned problems, and an object of the present invention is to provide an improved alternator in which initiation of the alternator rotation is properly detected by a simple structure without using signal lines for detecting turning-on of a key switch.

The alternator includes a rotor, a stationary armature, a rectifier and a voltage regulator. The rotor includes plural field poles and a rotor winding to which excitation current is supplied. The armature has multi-phase armature windings, such as three-phase windings. Alternating current is generated in the armature in a rotating field of the rotor. The rectifier rectifies the alternating current into a direct current that charges an on-board battery. The voltage regulator controls the output of the alternator by controlling excitation current supplied to the field winding.

In order to detect initiation of the rotor rotation, without using signal lines for detecting operation of a key switch, a resistor is connected to one of the phase-windings, e.g., a Y-phase winding. Upon initiation of the rotor rotation, a voltage induced by residual magnetism without supplying the excitation current appears across the resistor. A level of the induced voltage, however, is low because the amount of the residual magnetism is small. To increase the voltage across the resistor to a sufficient level to accurately detect the initiation of the rotor rotation, a capacitor is connected between another phase-winding, e.g., a Z-phase winding, and a negative terminal of the rectifier. The capacitor charged in a negative half cycle period is discharged in the following positive half cycle period thereby to increase the voltage across the resistor.

The voltage across the resistor is compared with a threshold voltage, or a reference voltage. It is determined that the rotor rotation is initiated when the voltage across the resistor becomes higher than the threshold voltage. Since the voltage across the resistor is increased to a sufficient level, the initiation of the rotation is accurately detected without lowering the threshold voltage level. Upon detection of the initiation of rotation, the excitation current starts to be supplied to the field winding, and thereafter the excitation current is controlled by the voltage regulator to maintain the output of the alternator at a desired level.

Preferably, a frequency of the voltage across the resistor is compared with a reference frequency in addition to detection of the voltage level, and initiation of the rotor rotation is detected when the voltage level reaches the threshold and the frequency exceeds a predetermined frequency. There is a possibility that the voltage level may be affected by leakage current flowing from the on-board battery to the resistor through the armature windings. Initiation of the rotor rotation is more accurately detected by detecting both the voltage level and the frequency. Preferably, an impedance of the capacitor in a frequency region corresponding to an idling speed of the automotive engine is set to a level lower than a resistance of the resistor. In this manner, the capacitor can be sufficiently charged thereby to increase the voltage level across the resistor.

The rectifier may be constituted by Zener diodes. In this case, the impedance of the capacitor is set not to raise the voltage across the resistor to a level exceeding a Zener voltage (a breakdown voltage in the inverse direction).

According to the present invention, the initiation of rotation is accurately detected by a simple circuit structure without using signal lines for detecting the key switch operation.

Other objects and features of the present invention will become more readily apparent from a better understanding of the preferred embodiment described below with reference to the following drawings.

DETAILED DESCRIPTION OF THE PREFERRED EMBODIMENT

Figure 1:
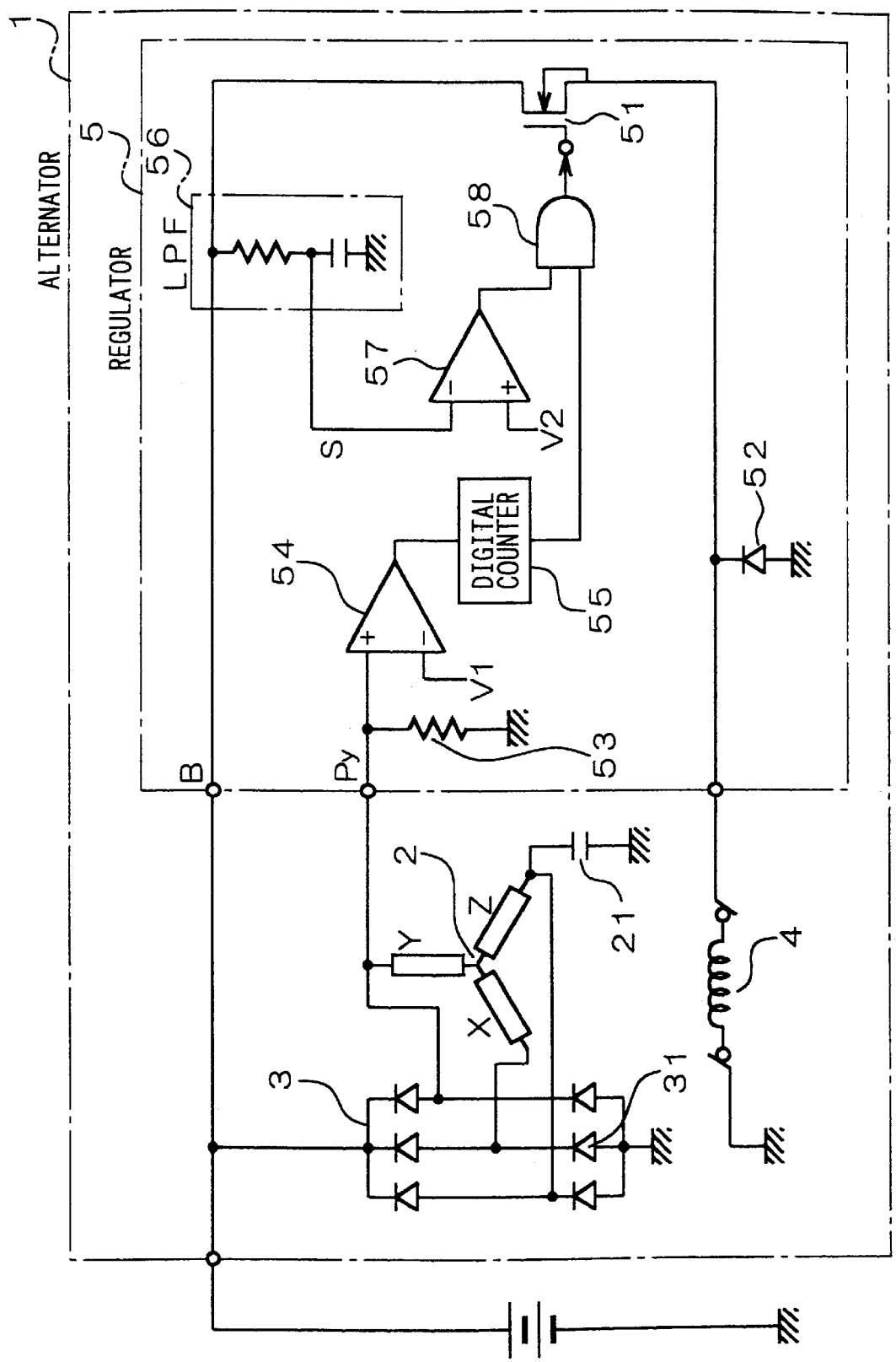
FIG. 1 is a block diagram showing an entire circuit structure of an alternator according to the present invention.

A preferred embodiment of the present invention will be described with reference to accompanying drawings. As shown in FIG. 1, an automotive alternator 1 includes armature windings 2, a rectifier 3, a field winding 4, and a voltage regulator 5. The armature windings 2 are multi-phase windings, e.g., three-phase windings, which are wound on an armature core. Alternating current generated in the armature windings 2 is supplied to the rectifier 3. A capacitor 21 is connected to an output terminal of one phase-winding of the armature windings 2, e.g., a Z-phase winding. The rectifier 3 is a full-wave rectifier constituted by six diodes. The rectifier 3 rectifies the alternating current supplied from the armature windings 2 into a direct current. The field winding 4 is wound on field poles of a rotor. Field current is supplied to the field winding 4 to generate a magnetic field which links the armature windings 2. The voltage regulator 5 controls an output voltage of the alternator to a predetermined voltage Vreg.

The voltage regulator 5 is composed of a power transistor 51, a current-circulating diode 52, a resistor 53, voltage comparators 54, 57, a digital counter 55, a low-pass filter (LFP) 56, and an AND-circuit 58. The power transistor 51 connected in series to the field winding 4 switches on and off the field current supplied to the field winding 4. The resistor 53 is connected between an output terminal of one phase-winding other than the phase-winding to which the capacitor 21 is connected, e.g. a Y-phase winding and the ground. A resistance of the resistor 53 is set to a level higher than an impedance of the capacitor at a basic alternating current frequency at a vicinity of an idling speed of the vehicle engine.

The voltage comparator 54 compares the Y-phase output voltage (the resistor 53 is connected to the Y-phase) with a first threshold voltage V1 and outputs a pulse voltage having the same frequency as that of the Y-phase output voltage. The digital counter 55 counts the number of pulses fed from the voltage comparator 54 and delivers a high level output if the counted number of pulses in a predetermined period of time is larger than a predetermined number. The low-pass filter 56, composed of e.g., a C-R (a capacitor-resistor) circuit eliminates high frequency components included in the alternator output voltage. The voltage comparator 57 compares the output voltage fed from the low-pass filter 56 with a second threshold voltage V2. The AND-circuit 58 outputs a logical multiplication of the output of the comparator 57 and the output of the digital counter 55.

Now, operation of the alternator 1 described above will be explained. When the rotor starts its rotation upon cranking-up of the engine, a voltage is induced in each phase winding of the armature windings 2. A voltage Py is supplied to one end of the resistor 53, and the voltage gradually increases according to increase of the rotational speed of the rotor. When the voltage Py exceeds the first predetermined threshold voltage V1, the comparator 54 outputs a high level signal as a pulsating signal representing the rotational speed of the rotor. The digital counter 55 counts the number of pulses in the signal fed from the comparator 54. When the number of pulses counted by the digital counter 55 reaches the number of pulses corresponding to the idling speed of the engine, the digital counter 55 outputs a high level signal.

The AND-circuit 58 outputs the same signal fed from the voltage comparator 57 when the signal fed from the digital counter 55 is a high level signal. Accordingly, when the alternator output voltage S fed from the low-pass filter 56 is lower than the second threshold voltage V2, the power transistor 51 becomes conductive thereby to supply exciting current to the field winding 4. When the alternator output voltage S fed from the low-pass filter 56 is higher than the second threshold voltage V2, the power transistor 51 becomes non-conductive thereby to terminate the exciting current supply to the field winding 4. The exciting current control by the power transistor 51 is initiated when the rotational speed of the rotor reaches a predetermined level, i.e., the idling speed level. In other words, start of the engine can be detected by the circuit included in the voltage regulator 5 without directly detecting operation of the key switch. In this manner, signal lines for detecting the key switch operation can be eliminated, and thereby wirings in the vehicle are simplified.

Figure 2:
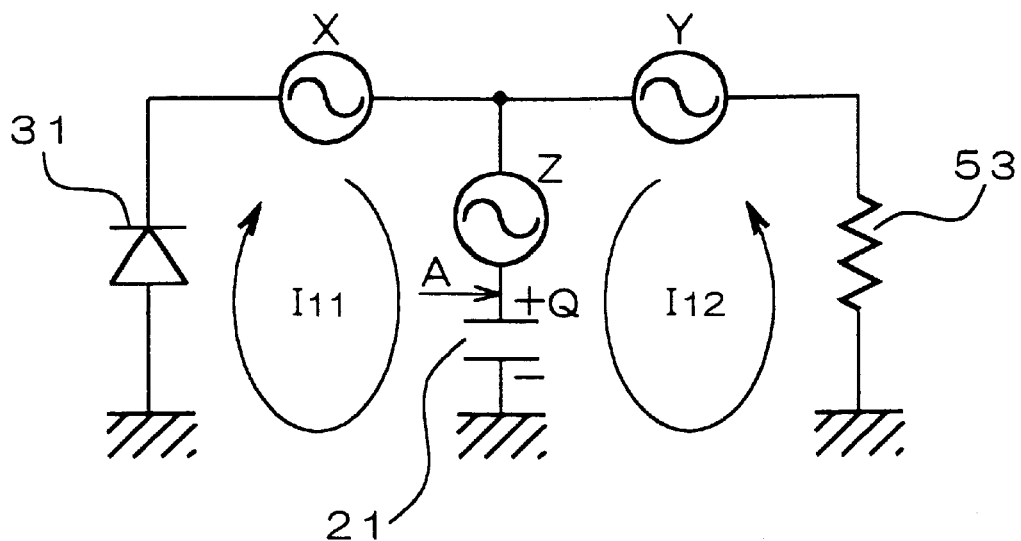
FIG. 2 is an equivalent circuit showing current flowing through a capacitor and a resistor in a negative half cyle.
Figure 3:
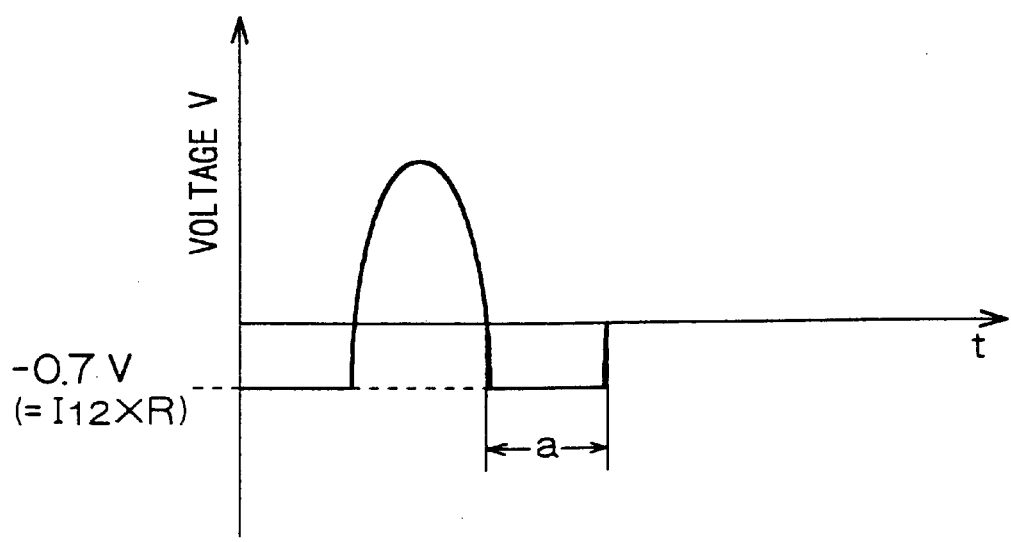
FIG. 3 is a graph showing a voltage appearing across the resistor in the negative half cycle.
Figure 5:
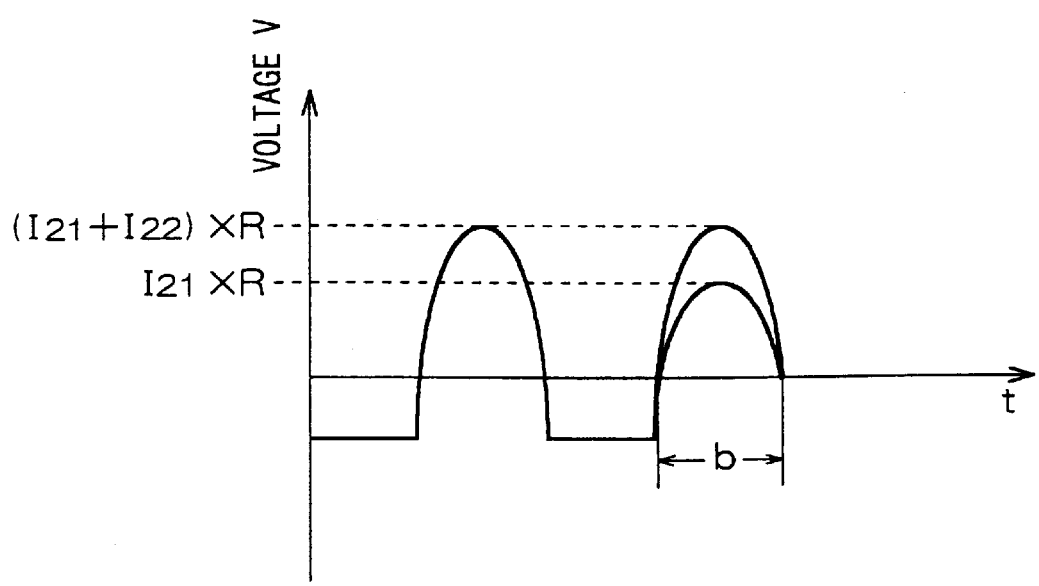
FIG. 5 is a graph showing a voltage appearing across the resistor in the positive half cycle.
Figure 6:
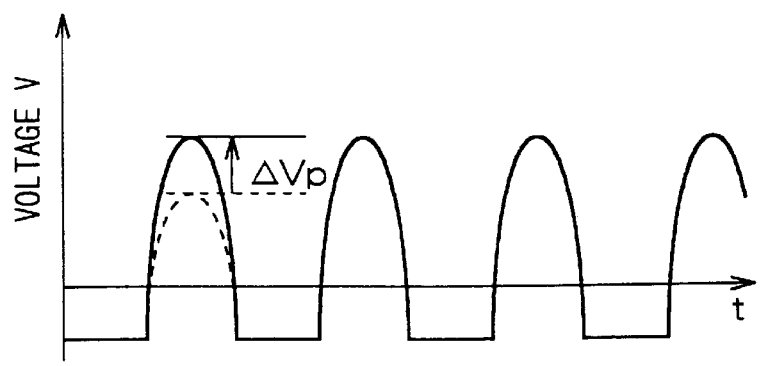
FIG. 6 is a graph showing a voltage across the resistor including a voltage increased by the capacitor.

The effects of the capacitor 21 connected to one phase winding (e.g., Z-phase winding) will be explained with reference to FIGS. 2–6. FIG. 2 shows an equivalent circuit composed of the capacitor 21, a negative-side diode 31, the resistor 53 and armature windings 2. Current $I_{11}$, $I_{12}$ flowing through the equivalent circuit during a negative half cycle period (a period "a" shown in FIG. 3) is shown by arrows in FIG. 2. The current is induced in the armature windings 2 due to the residual magnetism in the field poles. FIG. 3 shows a voltage appearing across the resistor 53 during the negative half cycle period "a". Current $I_{21}$, $I_{22}$ flowing through the equivalent circuit during a positive half cycle period (a period "b" shown in FIG. 5), which follows the negative half cycle period "a", is shown by arrows in FIG. 4. In FIG. 5, a voltage appearing across the resistor 53 during the positive half cycle period "b" is shown. A voltage $\Delta Vp$ increased by the capacitor 21 is shown in FIG. 6.

In the negative half cycle period, the current $I_{11}$, $I_{12}$ flows in the direction shown in FIG. 2 and charges the capacitor 21. However, the capacitor 21 is charged mostly by the current $I_{11}$ because a forward resistance of the negative-side diode 31 is lower than the resistance of the resistor 53. Accordingly, the voltage across the resistor 53 is clamped at a level of about minus 0.7 volt (−0.7 volt), which corresponds to a forward voltage drop of the negative-side diode 31. There is a following relation in the equivalent circuit: $I_{12} \times R = -0.7$ volt, where R is a resistance of the resistor 53. A potential at point "A" is Q/C volt because a potential difference Q/C appears across the capacitor 21, where electric charge stored in the capacitor is Q and a capacitance of the capacitor 21 is C.

Figure 4:
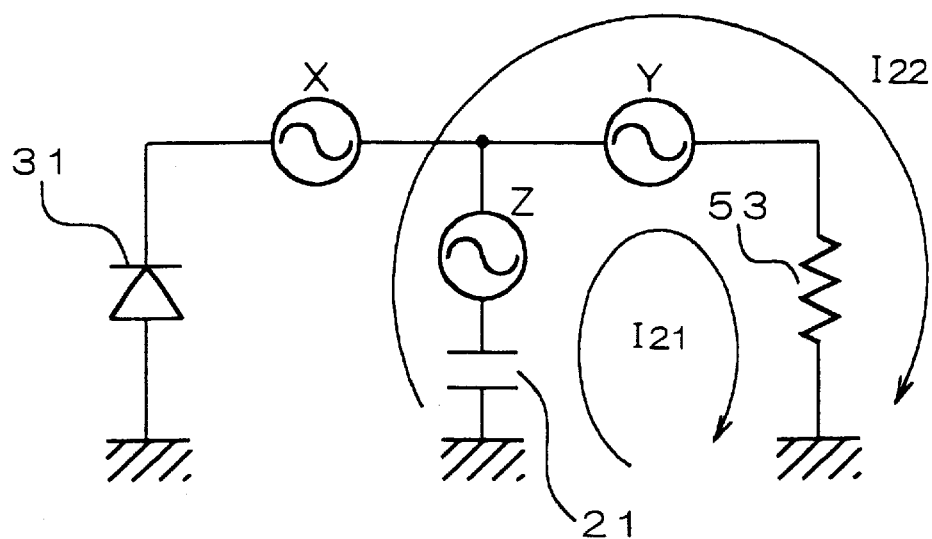
FIG. 4 is an equivalent circuit showing current flowing through the capacitor and the resistor in a positive half cycle.

In the positive half cycle period "b" following the negative half cycle period, the current $I_{21}$ due to a positive voltage induced by the residual magnetism and the current $I_{22}$ discharging the capacitor 21 which is charged in the preceding positive half cycle period flow in the directions shown in FIG. 4. Accordingly, a potential at a positive terminal of the resistor 53 is raised by a charged voltage of the capacitor 21, as shown in FIG. 5. This is because a certain time period is required to discharge the charges stored in the capacitor 21, and the voltage across the capacitor 21 does not become zero volt when the polarity of the induced voltage is reversed. Accordingly, the potential at the positive terminal of the resistor 53 is maintained at a potential raised by the capacitor charges for a period in which the charges remain. In other words, the voltage "e" volt induced by the residual magnetism in the Z-phase winding is raised by Q/C volt. That is, the voltage across the resistor 53 becomes (e+Q/C) volt.

Figure 7:
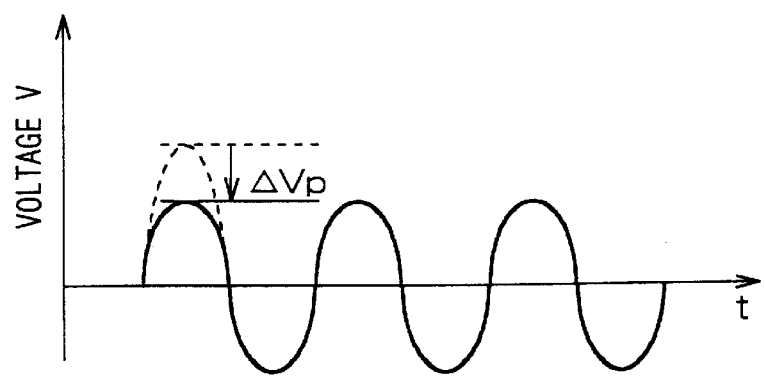
FIG. 7 is a graph showing a voltage across the resistor when a resistor is used in place of the capacitor.

The above phenomenon can be explained also in the following manner. Since current in an amount of $(I_{21}+I_{22})$ flows through the resistor 53, a voltage drop across the resistor 53 is: $(I_{21}+I_{22}) \times R$, where R is resistance of the resistor 53. The voltage across the resistor 53 increases by $\Delta Vp = (I_{22} \times R)$. FIG. 6 shows the voltage across the capacitor 53 which is raised by $\Delta Vp$. If a resistor is used in place of the capacitor 21, the voltage across the resistor 53 is not raised because the resistor does not store charges and its terminal voltage drops immediately when the polarity of the induced voltage is reversed. FIG. 7 shows the voltage across the resistor 53 in case a resistor is used in place of the capacitor 21. The voltage $\Delta Vp$ to be added by the capacitor 21 is not added to the voltage across the resistor 53.

As described above, charges stored in the capacitor 21 by a small amount of current induced by the residual magnetism functions to raise the voltage across the resistor 53. More particularly, considering a waveform of the induced voltage in the phase winding (Z-phase winding) to which the capacitor 21 is connected, charges stored in the capacitor 21 in the negative half cycle period "a" are discharged in the following positive half cycle period "b", thereby increasing an amount of current flowing through the resistor 53. The voltage across the resistor 53 is raised by the increased current. Initiation of the rotor rotation at a speed corresponding to the engine idling speed or lower can be detected by comparing the voltage across the resistor 53 with the first threshold voltage V1 without lowering the level of the threshold voltage. In this manner, initiation of the rotation can be easily detected without adding a new logic circuit and without using signal lines for detecting turning-on of the key switch.

The voltage $\Delta Vp$ increased by the capacitor 21 becomes larger according to increase of the current supplied from the capacitor 21 to the resistor 53 in the positive half cycle period. The S/N ratio in detecting the initiation of rotation can be improved by increasing the capacitor current supplied from the capacitor 21. By lowering the first threshold voltage V1, it is possible to detect the initiation of rotation even when the voltage across the resistor 53 is not much increased by the capacitor 21. However, it is not desirable to lower the first threshold voltage V1 because the S/N ratio in detecting the initiation of rotation becomes low.

Since the capacitor current is decreased if an alternating current impedance of the capacitor 21 is large, it is effective to set the capacitor impedance to a low level to obtain a large capacitor current. It is found out that a sufficiently high capacitor current can be obtained by making the capacitor impedance in a frequency region corresponding to the idling speed smaller than the resistance R of the resistor 53. In this manner, the voltage across the resistor 53 is sufficiently increased by the capacitor 21, and the initiation of rotation is detected without lowering the first threshold voltage V1.

The relation between the capacitor impedance and the resistance R will be further explained. The relation explained above is expressed by the formula: $1/\omega_0 \cdot C < R$, or $1/\omega_0 < CR$, where $\omega_0$ is electrical angular velocity of the alternator at a vicinity of the idling speed. This formula shows that an attenuation time constant CR of a closed circuit constituted by the capacitor 21 having capacitance C and the resistor having resistance R is larger than a reciprocal of the electrical angular velocity $\omega_0$. This means that the value of CR has to be set so that the charges stored in the capacitor 21 are not discharged in a too short period. If the charges are quickly discharged, the voltage across the resistance 53 cannot be increased to a sufficient level.

Figure 8:
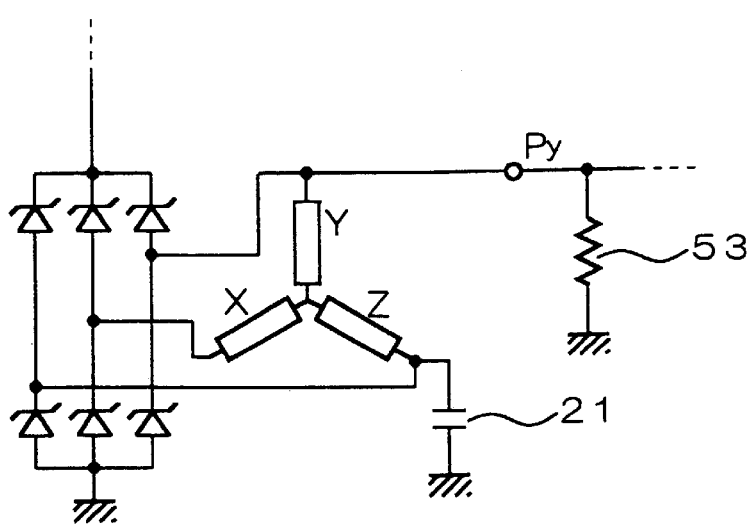
FIG. 8 is a circuit diagram showing part of an alternator that includes a rectifier using Zener diodes.

The present invention is not limited to the embodiment described above, but it may be modified in various ways. For example, the rectifier 3, which is constituted by usual diodes in the foregoing embodiment, may be constituted by Zener diodes, as shown in FIG. 8. In this case, however, energy consumption in the Zener diodes becomes high and the Zener diodes are excessively heated if the output voltage of the armature windings 2 exceeds a Zener voltage (an inverse breakdown voltage) of the Zener diode. Especially, in the structure as shown in FIG. 1, the voltage of the Y-phase winding can be increased even when on excitation current is supplied to the field winding 4, and the induced voltage in the Y-phase winding increases in proportion to the rotational speed of the rotor. Accordingly, if the Y-phase voltage exceeds the Zener voltage at a high rotational speed, it is necessary to provide a counter-measure to decrease the induced voltage. For example, as the counter-measure, it could be possible to magnetize the field poles in a reverse polarity to decrease an amount of linking magnetic flux. To realize this counter-measure, however, a so-called H bridge-type inverter is required, which makes the circuit complex and bulky. To avoid all of those troubles in using the Zener diodes, the capacitance of the capacitor 21 is set to a value that makes the voltage across the resistor 53 at the maximum rotational speed of the rotor, under a situation where no excitation current is supplied to the rotor, lower than the Zener voltage. In this manner, advantages of the present invention can be obtained in the circuit using the Zener diodes without providing any special counter-measure.

Though the pulse signals indicating the rotational speed are counted by the digital counter 55 in the above-described embodiment, the rotational speed signal may be converted into an analog signal by a frequency-voltage converter. Further, though the armature windings 2 are connected in Y-connection in the foregoing embodiment, it is, of course, possible to form the armature windings in Δ-connection.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An automotive alternator, comprising:
   a rotor having a plurality of field poles;
   a field winding for magnetizing the field poles;
   an armature for generating alternating voltage induced by a rotating field of the rotor, the armature including three-phase windings;
   a rectifier for rectifying the alternating voltage into a direct current voltage, the rectifier including at least one negative-side diode;
   a voltage regulator including a resistor for detecting a low voltage induced in one of the three-phase windings by residual magnetism in the field poles, the resistor being connected to the one of the three-phase windings; and
   a capacitor connected between another one of the three-phase windings and a negative terminal of the rectifier, wherein the voltage regulator detects initiation of rotation of the rotor based on a voltage across the resistor thereby to start excitation current supply to the field winding, and thereafter controls the excitation current to control an output voltage of the alternator.

2. The automotive alternator as in claim 1, wherein:
   the voltage regulator determines that rotation of the rotor is initiated when the voltage across the resistor is higher than a predetermined level and a frequency of the voltage exceeds a predetermined frequency.

3. The automotive alternator as in claim 1, wherein:
   an impedance of the capacitor in a basic frequency region corresponding to an idling speed of an automotive engine is set to a level lower than a resistance of the resistor.

4. The automotive alternator as in claim 2, wherein:
   an impedance of the capacitor in a basic frequency region corresponding to an idling speed of an automotive engine is set to a level lower than a resistance of the resistor.

5. The automotive alternator as in claim 1, wherein:
   the voltage regulator is composed of Zener diodes; and
   an impedance of the capacitor is set to such a level that the voltage appearing across the resistor at a maximum rotational speed of the rotor under a situation where no exciting current is supplied to the field winding becomes lower than a Zener voltage of the Zener diodes.

* * * * *